United States Patent
De Gaillard et al.

(10) Patent No.: US 6,517,150 B2
(45) Date of Patent: Feb. 11, 2003

(54) PLASTIC COVER FOR MOTOR VEHICLES

(75) Inventors: Francois De Gaillard, Mouilleron en pareds (FR); Michael Kölbl, Neuried (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 16 days.

(21) Appl. No.: 09/909,994

(22) Filed: Jul. 23, 2001

(65) Prior Publication Data

US 2002/0021032 A1 Feb. 21, 2002

(30) Foreign Application Priority Data

Jul. 21, 2000 (DE) .......................................... 100 35 912

(51) Int. Cl.$^7$ ................................................. B60J 10/10
(52) U.S. Cl. .............................. 296/216.06; 296/216.09
(58) Field of Search ........................ 296/216.06, 216.09

(56) References Cited

U.S. PATENT DOCUMENTS 5,538,317 A * 7/1996 Brocke et al. .......... 296/216.09
5,964,490 A * 10/1999 Schroeder et al. ......... 296/35.1
5,992,928 A * 11/1999 Kato et al. ............. 296/216.09

FOREIGN PATENT DOCUMENTS

| DE | 30 41 505 A1 | 6/1982 |
|---|---|---|
| DE | 198 33 934 A1 | 2/1999 |
| WO | WO 97/03855 | 2/1997 |

\* cited by examiner

*Primary Examiner*—Dennis H. Pedder
(74) *Attorney, Agent, or Firm*—Nixon Peabody LLP; David S. Safran

(57) ABSTRACT

A cover unit, for closing the roof opening in the solid skin of a motor vehicle roof, having a cover element, composed of an at least partially transparent plastic, and a reinforcing frame, for example, made of metal, which extends along the side edge of the cover element, and which bears a seal which surrounds the side edge of the cover element for contact against an essentially vertically running roof-mounted sealing surface. The reinforcing frame is cemented, using a flexible cement, to the cover element such that the cover element can move, in the transverse direction, relative to the reinforcing frame in order to enable thermal expansion of the cover element. The seal has a roof sealing area, contacting a roof-mounted sealing surface, which is substantially unaffected by thermal expansion of the cover element, and the seal has a cover sealing area for compensation of thermal expansion of the cover element.

19 Claims, 2 Drawing Sheets

PLASTIC COVER FOR MOTOR VEHICLES

BACKGROUND OF THE INVENTION

1. Field of the Invention

This invention relates to a cover unit for closing the roof opening in the solid skin of a motor vehicle roof. The cover unit comprises a cover element of an at least partially transparent plastic and a reinforcing frame, made of metal, which extends along the side edge of the cover element. The reinforcing frame also bears a seal which surrounds the side edge of the cover element for contact against an essentially vertically running roof-mounted sealing surface.

2. Description of Related Art

Due to their low weight and a fracture resistance, which is greater than that of glass covers, as well as the high degree of design freedom provided, plastic cover units are enjoying increasing popularity in motor vehicle construction. These advantages are offset however by the fact that the plastics conventionally used have a coefficient of thermal expansion which is much higher than that of metal, which can be a problem at the fluctuating temperatures to which vehicles are ordinarily exposed.

A conventional cover unit of this type is described in International Patent Application Publication WO 97/03855. The cover unit of WO 97/03855 has near the edge of the cover element a plurality of pins which are molded integrally to the bottom of the cover element. The reinforcing frame, which is located likewise on the bottom of the cover element, has slotted guide channels for receiving the pins. The slots all lay on the lines which run through the center of gravity of the cover element. A seal is also attached to the edge area of the reinforcing frame. This cover element has two disadvantages. Initially, it is noted that the cover unit is expensive to produce and install due to the plurality of pin connections to be molded on and then mounted. Secondly, the thermal expansion of the cover element increases the contact pressure of the seal against the roof frame; this can lead to sticking of the cover to the roof.

A similar cover unit is described in published German Patent Application DE 198 33 934 A1. In the motor vehicle window device shown in DE 198 33 934 A1, a plurality of holding devices, to which a reinforcing frame is screwed, are molded to the bottom of the plastic cover. In order to permit relative motion between the cover element and the reinforcing frame, upon thermal expansion of the cover element, holes having a diameter clearly greater than the diameter of the screws are formed in the holding devices. To prevent the screws from falling through overly large holes additional shims are placed on the screws. The cover element known from DE 198 33 934 A1 also requires complex, costly, and time-consuming production methods. Further, if all the screws are not equally tightened, and upon repeated expansion and contraction of the cover element, misalignment of the cover unit with respect to the roof frame occurs such that the cover unit gets stuck.

Another cover element is disclosed in German Patent DE 30 41 505 C2 where a rigid cover unit of the type mentioned above is disclosed in which the cover element is bordered by the reinforcing frame. Since the reinforcing frame in DE 30 41 505 C2, when under the influence of temperature, opposes the thermal expansion of the cover element, then twisting and unwanted warping of the cover element can occur.

SUMMARY OF THE INVENTION

In view of the problems which are inherent in the known cover units, it is an object of this invention to devise a cover unit of the type mentioned above which can be produced and installed more easily and more economically. Furthermore, the cover unit will enable construction of a vehicle roof having a so-called flush design, i.e., a roof in which the cover element and the seal are level to one another and the seal is not distorted upward out of the roof plane under the influence of the cover element, particularly during thermal expansion of the cover element. Expansion of the seal out of the roof plane can lead to unwanted wind noise.

This object is achieved by a cover unit in which the reinforcing frame is cemented to the cover element. The cementing is carried out using a flexible cement which enables the cover element to move in the transverse direction relative to the reinforcing frame in order to enable thermal expansion of the cover element. The result is that the seal has a roof sealing area which is substantially unaffected by thermal expansion of the cover element when in contact with the roof-mounted sealing surface, and that a cover sealing area for compensation of thermal expansion of the cover element is provided. Preparation of a roof sealing area which is substantially unaffected by thermal expansion of the cover element prevents warping of the seal provided between the cover element and the roof frame. The flexible adhesive connection between the reinforcing frame and the cover element also permits a certain amount of motion of the cover element relative to the reinforcing frame such that warping of the cover element is also inherently prevented. In order to ensure the sealing action between the cover element and the fixed roof surface, even during varying expansion of the cover element, a cover sealing area is provided which accommodates or compensates for the thermal expansion of the cover element.

In particular, the reinforcing frame has an edge area which runs essentially parallel to the side edge of the cover element and forms a contact surface both for the roof sealing area and also for the cover sealing area, and the edge area of the reinforcing frame encompasses a surface area which extends essentially vertically.

The seal can be slipped onto the edge area of the reinforcing frame or onto a seal carrier which is separately molded on the reinforcing frame. Then, the seal can contain a reinforcing insert, made of steel for example, in order to preserve the shape of the seal especially when it is slipped onto the edge area which thus prevents unwanted loosening of the seal from the reinforcing frame. However, the seal can also be cemented or locked to the reinforcing frame or joined in some other way.

Compensation for the thermal expansion of the cover element by means of the cover sealing area can be accomplished in several ways. According to one preferred embodiment, the cover sealing area and the part of the cover element which interacts with it are configured and arranged such that the cover element can also slide on the cover sealing area when the effects of temperature on the cover sealing area causes contraction or expansion of the cover element.

The cover sealing area and the part of the cover element which interacts with it can be configured and arranged by suitable shaping such that sliding motion of the cover element relative to the cover sealing area causes essentially no deformation of the cover sealing area. For example, this can be done by the cover sealing area and the cover element interacting along an engagement surface which extends essentially parallel to the direction of the relative motion of the cover element relative to the reinforcing frame caused by the effect of temperature. To facilitate the motion of the engagement surfaces against one another, there can also provided a lubricating varnish in the contact area between the cover sealing area and the cover element.

The arrangement can also be made such that the cover sealing area can be elastically deformed for compensation of the thermal expansion of the cover element.

When a flush design is desired, the visible top of the seal and the top of at least the area of the cover element adjacent to the seal are structured to extend essentially in a coplanar manner. Additionally, provisions can be made for the side edge of the cover element to fit over the elastic part of the cover sealing area such that when thermal expansion of the cover element occurs the elastic part of the cover sealing area dips under the side edge of the cover element.

Depending on the space required to accommodate the individual components and depending on the stiffness to be provided by the reinforcing frame, the edge area of the reinforcing frame can encompass a lowered area in which the cover sealing area is located.

Preferred embodiments of the invention are explained below with reference to the accompanying drawings.

DETAILED DESCRIPTION OF THE INVENTION

Figure 1:
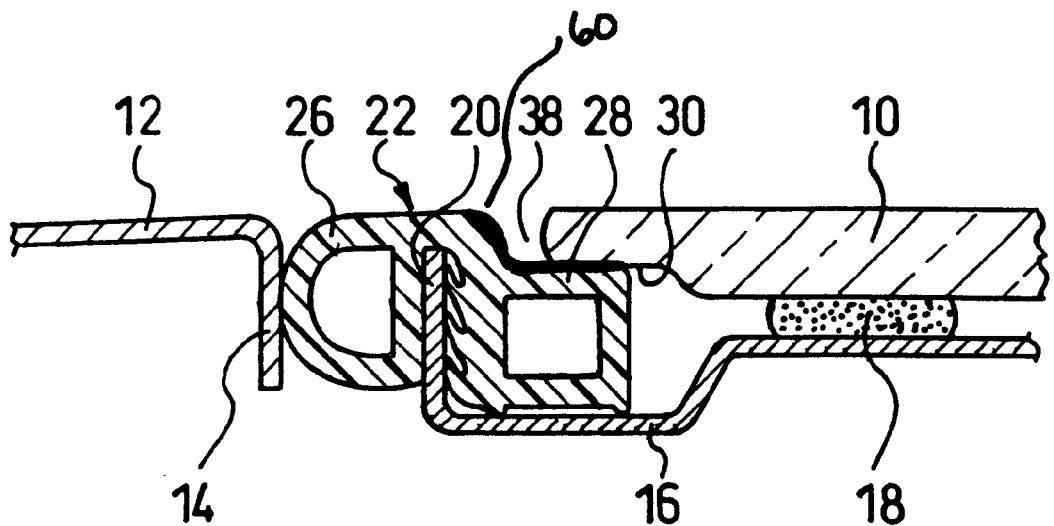
FIG. 1 is a sectional view through a motor vehicle roof with a cover unit according to a first embodiment of the invention.

FIG. 1 shows a motor vehicle roof in the area of a roof opening which is closed with a cover element 10. In the simplified representation as shown in FIG. 1, the fixed roof skin 12 is turned down in the area of the roof opening to form an essentially vertical sealing surface as is shown in the drawings at 14. It is clear that the roof opening can also be bordered by a roof frame (which is not shown) which would also form an essentially vertical sealing surface. The cover element 10 is composed of an at least partially transparent plastic, for example, polycarbonate.

A reinforcing frame 16 is cemented 70 onto the bottom of the cover element 10, and the frame is made of a material which has a low coefficient of thermal expansion. For example, the reinforcing frame 16 can be a sheet metal sectional part. In order not to hinder the cover element 10 from expanding under the action of heat, a flexible adhesive 18 is used to attach the reinforcing frame 16 to the cover element 10. The reinforcing frame 16, illustrated in FIG. 1, has a surface area 20 which is bent upwardly to extend essentially vertically and, and onto which a seal 22 is slipped.

The seal 22 is divided into a roof sealing area 26 which is illustrated in FIG. 1 on the left of the vertically running surface area 20 of the reinforcing frame 16 and which provides for sealing between the cover unit and the fixed roof skin 12. The seal 22 also is divided into a cover sealing area 28 which is located to the right of the surface area 20 and on which the side edge of the plastic cover element 10 rests. The side edge of the cover element 10 has a step 30, as is shown in FIG. 1, which rests on a step 38, having free space, in the cover sealing area 28 for purposes of achieving a structural height of the cover unit which is as small as possible.

When the outside temperature rises, the plastic cover element 10 expands noticeably, conversely the metal reinforcing frame 16, which extends around the periphery, experiences only negligible expansion. Since the position and the size of the reinforcing frame 16 determines the contact force of the roof sealing area 26 against the roof mounted vertical sealing surface 14 and since the reinforcing frame 16 maintains its position and size as the temperature changes, the sealing action of the cover unit can be decoupled relative to the fixed roof surface due to the temperature effects which led to expansion or contraction of the cover element. However, expansion or contraction of the cover element is accommodated by the free space of the cover sealing area step 38 on which the side edge of the cover element 10 can freely slide. To support the sliding action, in the contact area between the cover element 10 and the cover sealing area step 38, a harder sealing material or a lubricating varnish 60 can be used in this area.

Figure 2:
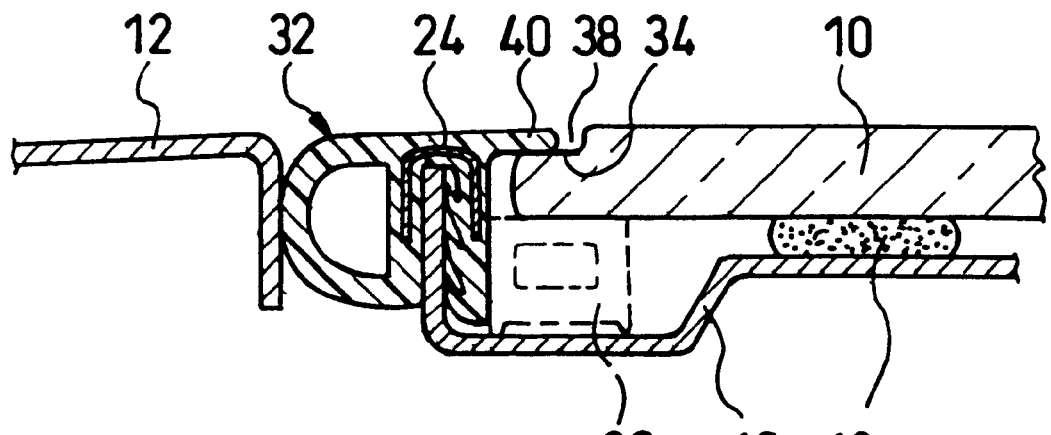
FIG. 2 shows a section through a cover unit according to a second embodiment of the invention.

In the modified embodiment as shown in FIG. 2, in the cover sealing area of the seal 32 there is a lip 40 which rests upon on a step 34 formed along the side edge of the cover element 10. Although the lip 40 can provide for a sufficient seal between the cover element 10 and the seal 32, the cover sealing area can have, similar to the embodiment shown in FIG. 1, a sealing area 36, for example in the form of a hollow section, on which the side edge of the cover element 10 rests and which is indicated in FIG. 2 by broken lines. To stabilize the shape of the seal 32 an insert 24, particularly a steel insert, can be inserted into the seal.

As is evident from FIGS. 1 and 2, when the cover element is subject to thermal expansion deformation of the seal does not occur, due to the free space of the cover sealing area step 38 on the seal 22 or 32 which have sufficient room so that the cover element 10 can expand. As can be seen in FIG. 2, by properly choosing the dimensions, a flush design can be implemented in which the cover element, the seal and the fixed roof surface form an almost continuous surface.

In the embodiments shown in FIGS. 1 and 2, no deformation of the seal occurs, while the cover element can slide relative to the cover sealing area. However, FIGS. 3 and 4 illustrate embodiments in which the cover sealing area is deformed when the cover element expands, but suitable construction measures for the seal prevent the seal from warping upward out of the plane of the cover element.

Figure 3:
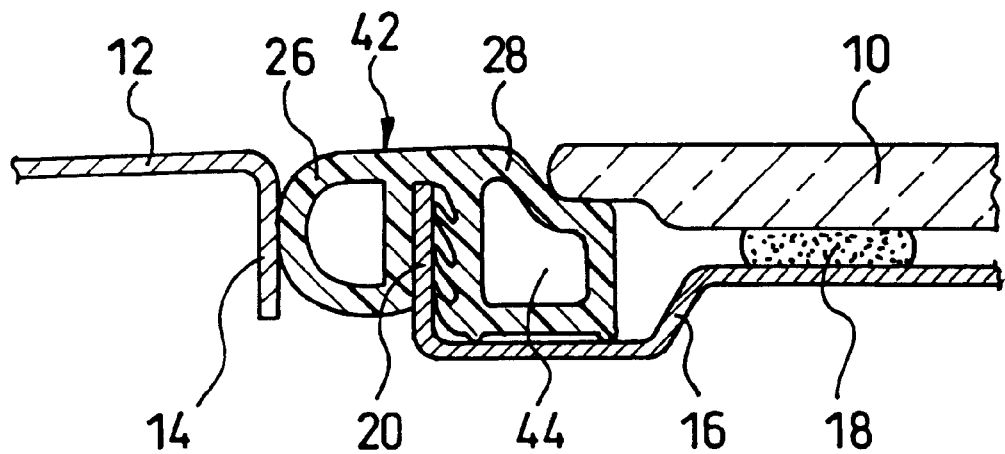
FIG. 3 shows a section through a cover unit according to a third embodiment of the invention.

According to FIG. 3, and similarly to FIGS. 1 and 2, on the bottom of the cover element 10 a reinforcing frame 16 is attached by means of a flexible cement 18. A seal 42 is slipped onto the surface area 20, which extends essentially vertically, and the seal 42 has a roof sealing area 26 and a cover sealing area 28. However, in FIG. 3, in the top part of the cover sealing area 28, there is no step, as in the embodiment as shown in FIG. 1. Instead, the seal 42 has a hollow chamber 44 which accommodates the deformation of the seal when it is pressed during expansion of the cover element 10. Similarly to the embodiments shown in FIGS. 1 and 2, the vertically running surface area 20 of FIG. 3 forms a stop for the cover sealing area 28 so that the roof sealing area 26 does not change its contact pressure against the roof-mounted sealing surface 14 when the cover sealing area 28 is compressed by expansion of the cover element 10. As FIG. 3 illustrates, a high degree of flush design can be implemented, along the contact surfaces between the roof sealing area 26 and the fixed roof skin 12 and between the cover sealing area 28 and the cover element 10, since the only unevenness in the roof surface is depressions, which are extremely small when compared to conventional roof systems.

Figure 4:
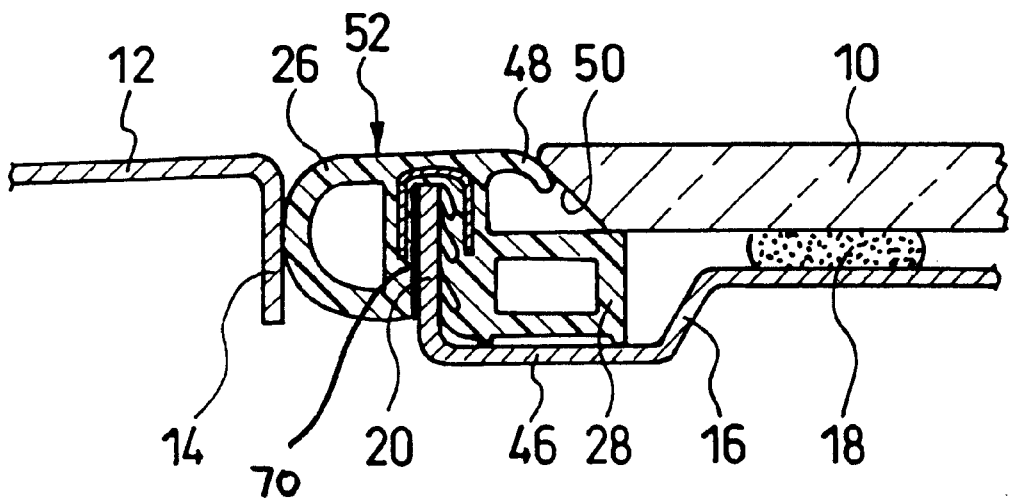
FIG. 4 shows a section through a cover unit according to a fourth embodiment of the invention.

FIG. 4 illustrates a modified embodiment of the cover unit shown in FIG. 3. In this embodiment, a reinforcing frame 16 is attached to the bottom of the cover element 10 by means of a flexible cement 18. On the lowered area 46 of the reinforcing frame 16 sits a seal 52 with its cover sealing area 28. The seal 52 further comprises a roof sealing area 26 which seals the cover unit against the fixed roof surface 12 of the motor vehicle. To fix the seal 52 on the reinforcing frame 16 the seal 52 can be slipped onto an essentially vertically extending surface area 20 of the reinforcing frame 16. To stabilize the shape of the seal 52, an insert, similar to the insert shown in FIG. 2, can be inserted into the seal. Of course, as an alternative or in addition to the insert, the seal can be attached to the reinforcing frame 16 with a cement 70 or by locking.

In contrast to the embodiment shown in FIG. 3, the seal 52 shown in FIG. 4 has a lip 48 in its cover sealing area 28 which dips down underneath the beveled edge 50 of the cover element 10. If the cover element 10 continues to expand as a result of heating, the lip 48 is continuously pressed under the beveled edge 50 of the cover element 10. The sliding action between the lip 48 and the edge 50 can be improved by applying a lubricant, for example, a lubricating varnish.

The above disclosed concepts can be applied both to a fixed cover roof and also to a roof having movable cover elements, for example, a sliding roof, a sliding and lifting roof, a spoiler roof, a louvered roof, and the like. While various embodiments in accordance with the present invention have been shown and described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

What is claimed is:

1. A cover unit for closing a roof opening in a motor vehicle roof comprising:

a cover element composed of at least a partially transparent plastic, a reinforcing frame having a thermal expansion characteristic different from a thermal expansion characteristic of the cover element and which extends along a side edge of the cover element, and a seal supported by the reinforcing frame such that the seal surrounds the side edge of the cover element and is adapted to contact an essentially vertically extending, roof-mounted sealing surface of the roof, wherein the reinforcing frame is cemented with a flexible cement to the cover element such that the cover element can move relative to the reinforcing frame in a transverse direction in order to permit thermal expansion sliding of the cover element, and wherein the seal has a roof sealing area, for contact with the roof-mounted sealing surface, which is essentially unaffected by the thermal expansion sliding of the cover element, and wherein the seal has a cover sealing area providing compensation for the thermal expansion sliding of the cover element.

2. A cover unit as set forth in claim 1, wherein the reinforcing frame has an edge area which is essentially parallel to the side edge of the cover element and which supports both the roof sealing area and the cover sealing area of the seal.

3. A cover unit as set forth in claim 2, wherein the edge area of the reinforcing frame comprises an essentially vertically extending surface area.

4. A cover unit as set forth in claim 2, wherein the edge area of the reinforcing frame comprises a recessed area in which the cover sealing area of the seal is located.

5. A cover unit as set forth in claim 2, wherein the seal is slipped onto the edge area of the reinforcing frame.

6. A cover unit as set forth in claim 5, wherein the seal contains a reinforcing insert.

7. A cover unit as set forth in claim 6, wherein the reinforcing insert is composed of steel.

8. A cover unit as set forth in claim 1, wherein the seal is cemented to the reinforcing frame.

9. A cover unit as set forth in claim 1, wherein the cover sealing area of the seal and the side edge of the cover element are assembled such that the cover element can slide on the cover sealing area under the influence of temperature.

10. A cover unit as set forth in claimed in claim 9, wherein the cover sealing area of the seal and the side edge of the cover element are assembled such that sliding motion of the cover element relative to the cover sealing area causes essentially no deformation of the cover sealing area.

11. A cover unit as set forth in claim 10, wherein the cover sealing area of the seal and the cover element interact along an engagement surface there between which extends essentially parallel to the direction of thermal expansion of the cover element.

12. A cover unit as set forth in claim 9, wherein a lubricating varnish is applied in a contact area between the cover sealing area and the cover element.

13. A cover unit as set forth in claim 1, wherein the cover sealing area is plastically deformable for compensation of the thermal expansion sliding of the cover element.

14. A cover unit as set forth in claim 1, wherein the seal has a visible upper surface and wherein the visible upper surface of the seal is essentially coplanar with an upper surface of the cover element adjacent to the seal.

15. A cover unit as set forth in claim 13, wherein a side edge of the cover element extends over an elastic part of the cover sealing area such that, during thermal expansion sliding of the cover element, the elastic part of the cover sealing area dips under the side edge of the cover element.

16. A motor vehicle roof having a fixed roof surface having a roof opening therein and a cover unit for closing the roof opening, said cover unit comprising:

a cover element composed of at least a partially transparent plastic, a reinforcing frame having a thermal expansion characteristic different from a thermal expansion characteristic of the cover element and which extends along a side edge of the cover element, and a seal supported by the reinforcing frame such that the seal surrounds the side edge of the cover element and contacts an essentially vertically extending, roof-mounted sealing surface of the fixed roof surface, wherein the reinforcing frame is cemented with a flexible cement to the cover element such that the cover element can move relative to the reinforcing frame in a transverse direction in order to permit thermal expansion sliding of the cover element, and wherein the seal has a roof sealing area, which contacts the roof-mounted sealing surface in a closed position of the cover element, which is essentially unaffected by the thermal expansion sliding of the cover element, and wherein the seal has a cover sealing area providing compensation for the thermal expansion sliding of the cover element.

17. A motor vehicle roof as set forth in claim 16, wherein the reinforcing frame has an edge area which is essentially parallel to the side edge of the cover element and which supports both the roof sealing area and the cover sealing area of the seal.

18. A motor vehicle roof as set forth in claim 17, wherein the edge area of the reinforcing frame comprises an essentially vertically extending surface area.

19. A motor vehicle roof as set forth in claim 16, wherein the cover sealing area of the seal extends inward from the reinforcing frame to a position in which the cover element and the cover sealing area are overlapped with respect to each other.

* * * * *